US012591881B2

(12) United States Patent
Raman et al.

(10) Patent No.: US 12,591,881 B2
(45) Date of Patent: Mar. 31, 2026

(54) METHOD AND SYSTEM FOR BLOCKCHAIN SERVICE ORCHESTRATION

(71) Applicant: Tata Consultancy Services Limited, Mumbai (IN)

(72) Inventors: Malini Raman, Chennai (IN); Ashok Seshadri, Chennai (IN); Namitha Jeremiah, Chennai (IN); Saptarshee Bhattacharjee, Chennai (IN)

(73) Assignee: Tata Consultancy Services Limited, Mumbai (IN)

( * ) Notice: Subject to any disclaimer, the term of this patent is extended or adjusted under 35 U.S.C. 154(b) by 104 days.

(21) Appl. No.: 18/404,640

(22) Filed: Jan. 4, 2024

(65) Prior Publication Data

US 2024/0257112 A1     Aug. 1, 2024

(30) Foreign Application Priority Data

Jan. 31, 2023    (IN) .............................. 202321006331

(51) Int. Cl.
G06Q 20/38 (2012.01)
(52) U.S. Cl.
CPC ................................. G06Q 20/382 (2013.01)
(58) Field of Classification Search
CPC ................................................ G06Q 20/3672
See application file for complete search history.

(56) References Cited

U.S. PATENT DOCUMENTS

2007/0294205 A1* 12/2007 Xu ...................... G06F 16/2255
2011/0123021 A1* 5/2011 Tepper ................. H04L 9/0861
713/181
(Continued)

FOREIGN PATENT DOCUMENTS

WO    WO2019087119 A1    5/2019

OTHER PUBLICATIONS

Shbair, Wazen M. et al., "Blockchain Orchestration and Experimentation Framework: A Case Study of KYC", Title of the item: IEEE/IFIP Network Operations and Management Symposium, Date: 2018, Publisher: IEEE, Link: https://orbilui.uni.lu/bitstream/10993/35467/1/blockchain-orchestration-experimentation.odf.

*Primary Examiner* — John W Hayes
*Assistant Examiner* — Justin Abel Jimenez
(74) *Attorney, Agent, or Firm* — Finnegan, Henderson, Farabow Garrett & Dunner, LLP

(57)                    ABSTRACT

Several factors have contributed to an increased demand for an enterprise blockchain in various industries such as reduced administrative cost, faster transaction processing, reduced likelihood of fraud etc. Several blockchain applications and technologies have emerged, however, there is a need to interoperate with various blockchain platforms by defining the interoperability semantics. Embodiments herein provide a method and system for a framework to orchestrate and manage the transactions within or across various blockchain platforms without making any change to the underlying platform protocols. Framework allows to orchestrate operations within or across various blockchain platforms without impacting blockchain protocol layer thereby reducing time and effort needed in creating targeted interoperability solution for each blockchain platform. A hash-tree is created out of service orchestration and various service invocation allows to create a complete map of service execution within or across various blockchain platforms to trace its effect on various asset ledgers and wallets.

10 Claims, 6 Drawing Sheets

200

Receiving a request for a business transaction as an input to orchestrate one or more services of a business operation within or across one or more blockchain platforms using an orchestration engine —— 202

Identifying a configuration associated to each of the one or more services, wherein the configuration provides an operational need of the business that is executed one of a) parallelly or b) sequentially from a service pool —— 204

Generating a service packet instance for each of the one or more services based on the identified configuration by a service execution controller —— 206

Stamping the generated service packet instance with a unique hash using a pseudo-random generator —— 208

Analyzing the stamped service packet instance to identify a) an asynchronous service packet instance or b) a synchronous service packet instance —— 210

Determining a nature of processing of the identified asynchronous service packet instance or b) the synchronous service packet instance —— 212

(A)

(56)                    References Cited

U.S. PATENT DOCUMENTS

| 2012/0207024 | A1* | 8/2012 | Kohn | H04L 43/026 |
| | | | | 370/235 |
| 2016/0057237 | A1* | 2/2016 | Yang | H04L 63/123 |
| | | | | 709/224 |
| 2019/0268277 | A1 | 8/2019 | Asthana et al. | |
| 2019/0317936 | A1 | 10/2019 | Keskar | |
| 2020/0175003 | A1* | 6/2020 | Jiang | G06F 16/2379 |
| 2022/0086004 | A1* | 3/2022 | Chauhan | H04L 9/3226 |

* cited by examiner

100

104-1

106

104-2

104-N 102    108    110

112    114

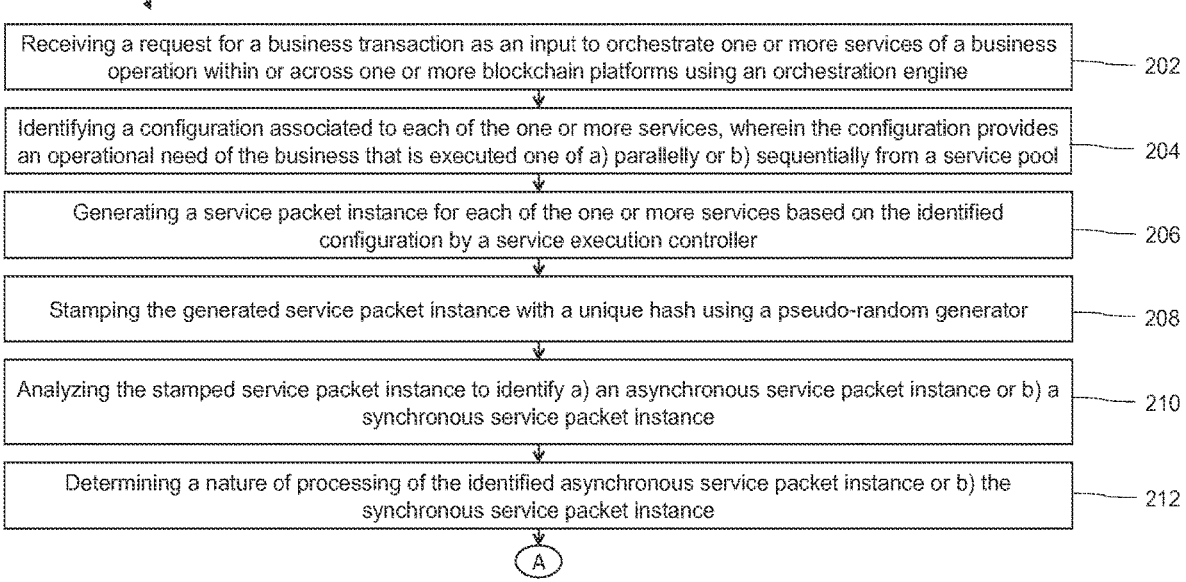

200

Receiving a request for a business transaction as an input to orchestrate one or more services of a business operation within or across one or more blockchain platforms using an orchestration engine — 202

Identifying a configuration associated to each of the one or more services, wherein the configuration provides an operational need of the business that is executed one of a) parallelly or b) sequentially from a service pool — 204

Generating a service packet instance for each of the one or more services based on the identified configuration by a service execution controller — 206

Stamping the generated service packet instance with a unique hash using a pseudo-random generator — 208

Analyzing the stamped service packet instance to identify a) an asynchronous service packet instance or b) a synchronous service packet instance — 210

Determining a nature of processing of the identified asynchronous service packet instance or b) the synchronous service packet instance — 212

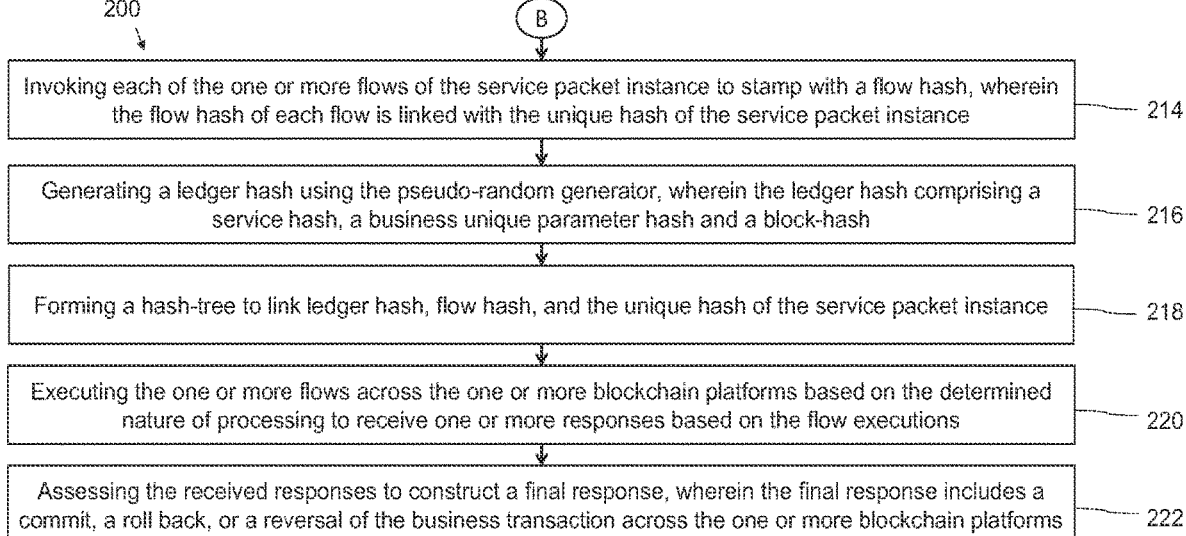

200

B

Invoking each of the one or more flows of the service packet instance to stamp with a flow hash, wherein the flow hash of each flow is linked with the unique hash of the service packet instance — 214

Generating a ledger hash using the pseudo-random generator, wherein the ledger hash comprising a service hash, a business unique parameter hash and a block-hash — 216

Forming a hash-tree to link ledger hash, flow hash, and the unique hash of the service packet instance — 218

Executing the one or more flows across the one or more blockchain platforms based on the determined nature of processing to receive one or more responses based on the flow executions — 220

Assessing the received responses to construct a final response, wherein the final response includes a commit, a roll back, or a reversal of the business transaction across the one or more blockchain platforms — 222

FIG. 2B

METHOD AND SYSTEM FOR BLOCKCHAIN SERVICE ORCHESTRATION

CROSS-REFERENCE TO RELATED APPLICATIONS AND PRIORITY

This U.S. patent application claims priority under 35 U.S.C. § 119 to Indian Application number 202321006331, filed on Jan. 31, 2023. The entire contents of the aforementioned application are incorporated herein by reference.

TECHNICAL FIELD

The disclosure herein generally relates to the field of blockchain service orchestration and more particularly, to a system and method for a framework to orchestrate one or more services within or across one or more blockchain platforms.

BACKGROUND

Blockchain networks operate in isolated ecosystems as they try to resolve a unique set of needs. However, current technologies do not allow various blockchain platforms to communicate with each other without the help of intermediaries. Existing technologies make use of oracles to establish communication between blockchain and outside world. However, these are limited to traditional systems and do not handle inter-blockchain communication.

Several blockchain applications and technologies have emerged in the last few years, however, there is a need to interoperate and transact with multiple blockchain platforms by defining the interoperability semantics.

SUMMARY

Embodiments of the disclosure present technological improvements as solutions to one or more of the above-mentioned technical problems recognized by the inventors in conventional systems. For example, in one embodiment, a method and system for a framework to orchestrate one or more services within or across one or more blockchain platforms is provided.

In one aspect, a processor-implemented method for a framework to orchestrate one or more services within or across one or more blockchain platforms. The processor-implemented method comprising receiving, via an input/output interface, a request for a business transaction as an input to orchestrate one or more services of a business operation within or across one or more blockchain platforms using an orchestration engine. Further, the processor-implemented method comprising identifying a configuration associated to each of the one or more services and generating a service packet instance for each of the one or more services based on the identified configuration by a service execution controller. Furthermore, the processor-implemented method comprising stamping the generated service packet instance with a unique hash using a pseudo-random generator and analyzing the stamped service packet instance to identify a) an asynchronous service packet instance or b) a synchronous service packet instance.

Further, the processor-implemented method comprising determining nature of processing of the identified asynchronous service packet instance or b) the synchronous service packet instance. Furthermore, the processor-implemented method comprising invoking each of the one or more flows of the service packet instance to stamp with a flow hash and generating a ledger hash using the pseudo-random generator. Further, the processor-implemented method comprising forming a hash-tree to link ledger hash, flow hash, and the unique hash of the service packet instance and executing the one or more flows within or across the one or more blockchain platforms based on the determined nature of processing to receive one or more responses based on the flow executions. Finally, the processor-implemented method comprising assessing the received one or more responses to construct a final response, wherein the final response includes a commit, a roll back, or a reversal of the business transaction within or across the one or more blockchain platforms.

In another aspect, a system for a framework to orchestrate one or more services within or across one or more blockchain platforms is provided. The system includes at least one memory storing programmed instructions, one or more Input/Output (I/O) interfaces, and one or more hardware processors operatively coupled to the at least one memory. The one or more hardware processors are configured by the programmed instructions to receive a request for a business transaction as an input to orchestrate one or more services of a business operation within or across one or more blockchain platforms using an orchestration engine. Further, the one or more hardware processors are configured by the programmed instructions to identify a configuration associated to each of the one or more services and generate a service packet instance for each of the one or more services based on the identified configuration by a service execution controller. Furthermore, the one or more hardware processors are configured by the programmed instructions to stamp the generated service packet instance with a unique hash using a pseudo-random generator and analyze the stamped service packet instance to identify a) an asynchronous service packet instance or b) a synchronous service packet instance.

Further, the one or more hardware processors are configured by the programmed instructions to determine nature of processing of the identified asynchronous service packet instance or b) the synchronous service packet instance. Furthermore, the one or more hardware processors are configured by the programmed instructions to invoke each of the one or more flows of the service packet instance to stamp with a flow hash and generate a ledger hash using the pseudo-random generator. Further, the one or more hardware processors are configured by the programmed instructions to form a hash-tree to link ledger hash, flow hash, and the unique hash of the service packet instance and execute the one or more flows within or across the one or more blockchain platforms based on the determined nature of processing to receive one or more responses based on the flow executions. Finally, the one or more hardware processors are configured by the programmed instructions to assess the received one or more responses to construct a final response, wherein the final response includes a commit, a roll back, or a reversal of the business transaction within or across the one or more blockchain platforms.

In yet another aspect, one or more non-transitory machine-readable information storage mediums are provided comprising one or more instructions, which when executed by one or more hardware processors causes a method for a framework to orchestrate one or more services within or across one or more blockchain platforms. The processor-implemented method comprising receiving, via an input/output interface, a request for a business transaction as an input to orchestrate one or more services of a business operation within or across one or more blockchain platforms using an orchestration engine. Further, the processor-implemented method comprising identifying a configuration associated to each of the one or more services and generating a service packet instance for each of the one or more services based on the identified configuration by a service execution controller. Furthermore, the processor-implemented method comprising stamping the generated service packet instance with a unique hash using a pseudo-random generator and analyzing the stamped service packet instance to identify a) an asynchronous service packet instance or b) a synchronous service packet instance.

Further, the processor-implemented method comprising determining nature of processing of the identified asynchronous service packet instance or b) the synchronous service packet instance. Furthermore, the processor-implemented method comprising invoking each of the one or more flows of the service packet instance to stamp with a flow hash and generating a ledger hash using the pseudo-random generator. Further, the processor-implemented method comprising forming a hash-tree to link ledger hash, flow hash, and the unique hash of the service packet instance and executing the one or more flows within or across the one or more blockchain platforms based on the determined nature of processing to receive one or more responses based on the flow executions. Finally, the processor-implemented method comprising assessing the received one or more responses to construct a final response, wherein the final response includes a commit, a roll back, or a reversal of the business transaction within or across the one or more blockchain platforms.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIGS. 2A and 2B, collectively read as FIG. 2, is an exemplary flow diagram illustrating a method for a framework to orchestrate one or more services within or across one or more blockchain platforms, by the system of FIG. 1, in accordance with some embodiments of the present disclosure.

DETAILED DESCRIPTION OF EMBODIMENTS

Figure 1:
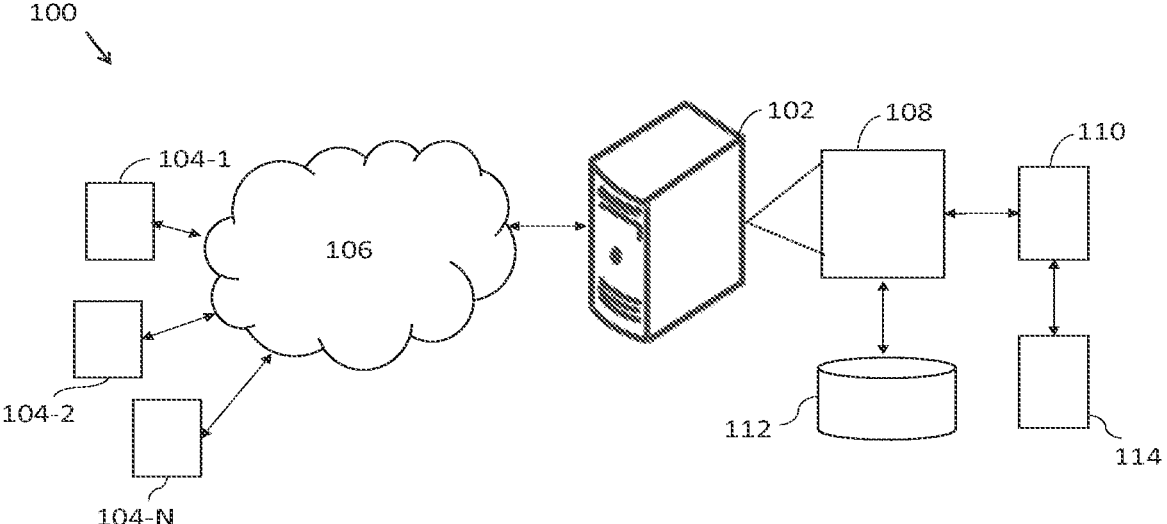
FIG. 1 illustrates a network diagram of a system for a framework to orchestrate one or more services within or across one or more blockchain platforms, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Blockchain networks operate in isolated ecosystems as they try to resolve a unique set of needs. However, current technologies do not allow various blockchain platforms to communicate with each other without the help of intermediaries. Existing technologies make use of oracles to establish communication between blockchain and outside world. However, these are limited to traditional systems and do not handle inter-blockchain communication. Thus, there is a need to introduce a layer which can seamlessly orchestrate services within or across different platforms.

Therefore, embodiments herein provide a method and system for a framework to orchestrate one or more services within or across one or more blockchain platforms. The services can be invoked sequentially or in parallel depending on the transaction outcome corresponding to a final ledger update within or across platforms. The process is also uniquely stamped by creating a hash tree of service requests. Some of the blockchain platforms that can be orchestrated, but not limited to, using the orchestration process are Hyperledger Fabric, Corda, Ethereum, Bitcoin, Ripple, Bitcoin Cash and Tezos. The orchestration process is also designed to automatically learn from past data without explicit programming, assist with auto selection of services for invocation depending on business scenarios, auto creation of alternate flows in case of failures, and optimization of service invocation based on the process response. The orchestration engine manages the orchestration of the services within or across different Blockchain platforms. Each business operation is configured as a string of services which can be executed in parallel or sequentially depending on the operational need. The service invocation can be time based, or event based or triggered from user interface (UI).

Referring now to the drawings, and more particularly to FIG. 1 through FIG. 5, where similar reference characters denote corresponding features consistently throughout the figures, there are shown preferred embodiments and these embodiments are described in the context of the following exemplary system and/or method.

FIG. 1 illustrates a network diagram of a system 100 for a framework to orchestrate services within a Blockchain platform or within or across Blockchain platforms. Although the present disclosure is explained considering that the system 100 is implemented on a server, it may also be present elsewhere such as a local machine. It may be understood that the system 100 comprises one or more computing devices 102, such as a laptop computer, a desktop computer, a notebook, a workstation, a cloud-based computing environment and the like. It will be understood that the system 100 may be accessed through one or more input/output interfaces 104-1, 104-2 . . . 104-N, collectively referred to as I/O interface 104. Examples of the I/O interface 104 may include, but are not limited to, a user interface, a portable computer, a personal digital assistant, a handheld device, a smartphone, a tablet computer, a workstation, and the like. The I/O interface 104 are communicatively coupled to the system 100 through a network 106.

In an embodiment, the network 106 may be a wireless or a wired network, or a combination thereof. In an example, the network 106 can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 106 may include a variety of network devices, including routers, bridges, servers, computing devices, storage devices. The network devices within the network 106 may interact with the system 100 through communication links.

The system 100 may be implemented in a workstation, a server, and a network server. In an embodiment, the computing device 102 further comprises one or more hardware processors 108, one or more memory 110, hereinafter referred as a memory 110 and a data repository 112, for example, a repository 112. The data repository 112 may also be referred as a dynamic knowledge base 112 or a knowledge base 112. The memory 110 is in communication with the one or more hardware processors 108, wherein the one or more hardware processors 108 are configured to execute programmed instructions stored in the memory 110, to perform various functions as explained in the later part of the disclosure. The repository 112 may store data processed, received, and generated by the system 100. The memory 110 further comprises a plurality of modules 114. The plurality of modules 114 is configured to perform various functions.

The system 100 supports various connectivity options such as BLUETOOTH®, USB, ZigBee and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. The components and functionalities of the system 100 are described further in detail.

FIGS. 2A and 2B, collectively read as FIG. 2, is an exemplary flow diagrams illustrating a processor-implemented method 200 for a framework to orchestrate one or more services within or across one or more blockchain platforms implemented by the system of FIG. 1, according to some embodiments of the present disclosure.

Initially at step 202 of the method 200, a request for a business transaction is received as an input, via the input/output interface 104, to an orchestration engine to orchestrate one or more services of a business operation within or across one or more blockchain platforms. It is to be noted that the orchestration engine comes with the following features:

1. The one or more services are auto discovered, and endpoints are protected using standard authentication protocols.
2. Data undergoes sanitization process to conform to the requirements of the one or more blockchain platforms automatically using a dynamic data mapper service based on a Machine Learning (ML).
3. The orchestration engine invokes one or more services within or across one or more blockchain platforms simultaneously and invokes transaction commit upon transaction confirmation from one or more blockchain platforms.
4. In case of a parallel service execution, if the response from 1 out of 3 service invocations is not successful one of (1) auto rollback services is initiated, or (2) commit is being initiated for the first service.
5. In case of a sequential service execution, if the response of 2nd service fails, then the 1st service is rolled back or a reversal transaction is invoked, and the 3rd service will not be initiated.
6. The service execution is tracked using a hash-tree which is linked dynamically within or across multiple transaction requests and asset ledgers allowing complete visibility of interdependency of transaction and service requests within or across one or more blockchain platforms and the impact of each service request within or across asset ledgers and wallets.
7. The service invocation can be time-based, event-based on invoked on a manual trigger.
8. The service input can be of any format such as XML, CSV, JSON or POJO which gets transformed using AI training models for easier integration (Allows the participants to bring their own swagger or input data structures).
9. The execution is made fault tolerant by configuring auto retries and exception approval workflows and SLAs.
10. A user interface (UI) based configuration of entire blockchain service orchestration process.

At the next step 204 of the method 200, the one or more hardware processors 108 are configured by the programmed instructions to identify a configuration associated to each of the one or more services. The configuration provides an operational need of the business that is executed either parallelly or sequentially from a service pool.

At the next step 206 of the method 200, the one or more hardware processors 108 are configured by the programmed instructions to generate a service packet instance for each of the one or more services based on the identified configuration by a service execution controller. The service packet instance (i.e., incoming transaction) includes one or more flows within or across the one or more blockchain platforms.

Figure 3:
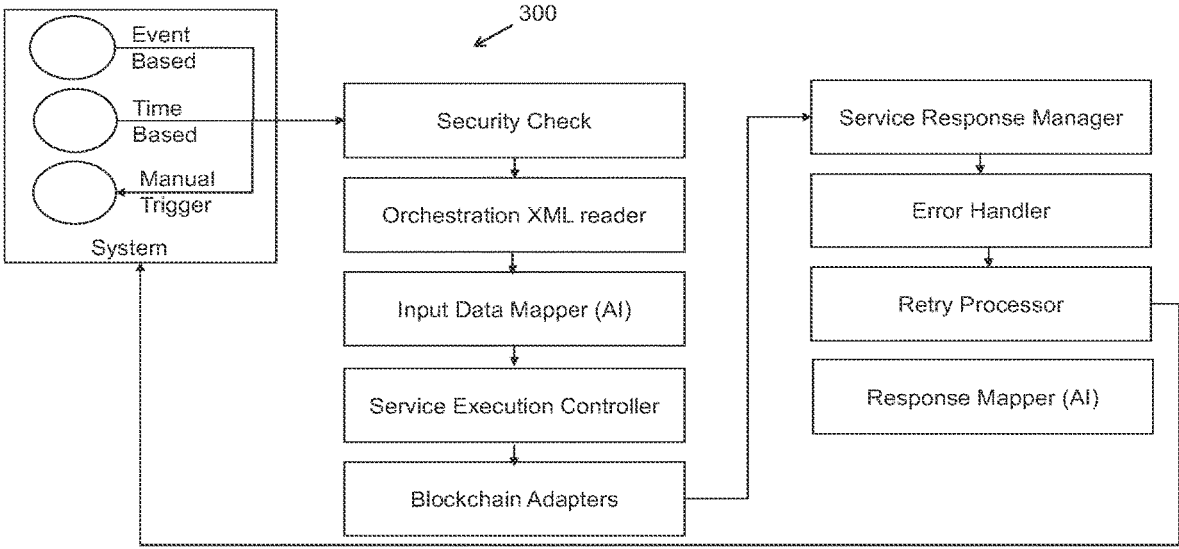
FIG. 3 is a functional block diagram to illustrate an orchestration engine of the system of FIG. 1, in accordance with some embodiments of the present disclosure.

Further, the service execution controller generates the service packet constituting one or more flows within or across the blockchain platforms that the service would execute as per the orchestration configuration defined for the given service. Any service invocation will reach orchestration engine post security checks including authentication, authorization, and role-based access checks. Orchestration engine is executed based on the orchestration XML which converts the input data objects (JSON/XML) to smart contract readable semantics using Input Data Mapper. Thereafter, the service execution controller executes the service as per FIGS. 2A and 2B and invokes smart contracts using blockchain adapters and the response manager evaluates the responses to prepare the final response to service request. Error handler and retry processor manages the error handling and reties execution for a configurable number of times, thereafter the response mapper converts the response from blockchain semantics to service output semantics (JSON/XML) before sending response back as illustrated in FIG. 3.

At the next step 208 of the method 200, the one or more hardware processors 108 are configured by the programmed instructions to stamp the generated service packet instance with a unique hash using a pseudo-random generator. The unique hash comprising a Service-ID of the service packet, collection of business unique fields for world state acted upon, data and time of service invocation, unique ID of the user who has initiated the transaction and a random byte generated from pseudo-random generators.

At the next step 210 of the method 200, the one or more hardware processors 108 are configured by the programmed instructions to analyze the stamped service packet instance to identify a) an asynchronous service packet instance or b) a synchronous service packet instance.

At the next step 212 of the method 200, the one or more hardware processors 108 are configured by the programmed instructions to determine a nature of processing of the identified asynchronous service packet instance and the synchronous service packet instance. The nature of processing includes a sequential processing and a parallel processing from the service pool.

Figure 4:
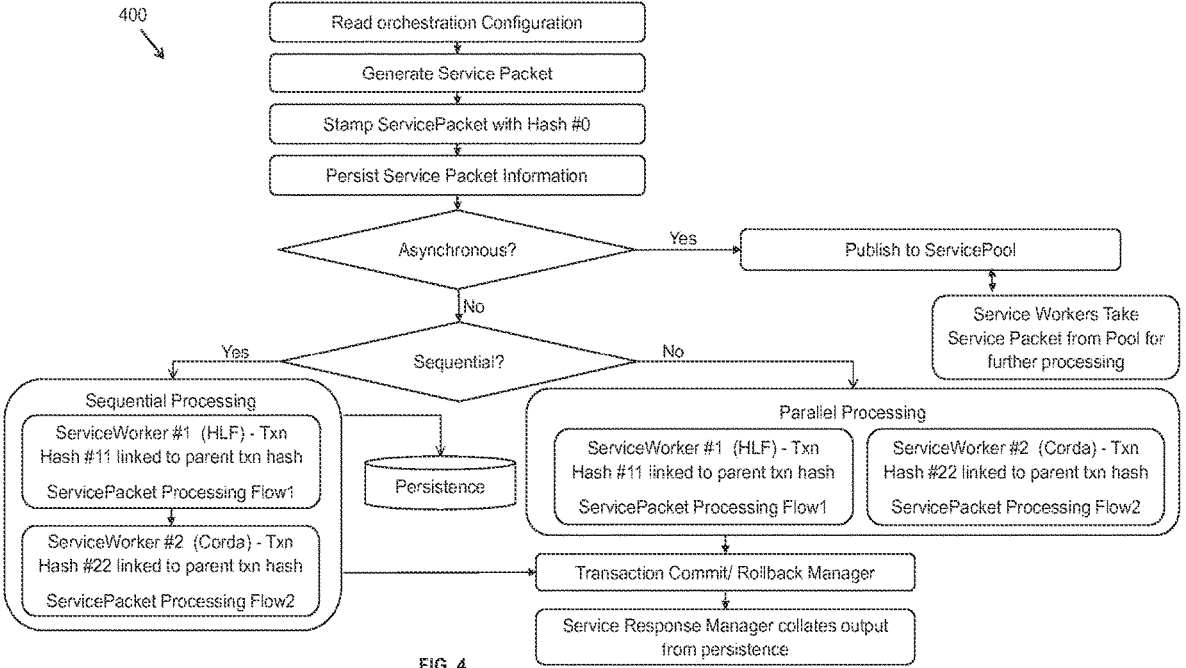
FIG. 4 is a process flow diagram to illustrate a blockchain interoperability, in accordance with some embodiments of the present disclosure.

In one example, wherein the synchronous flows are executed by a service worker. The service worker is a core processing unit architected for each blockchain adapter. In the synchronous sequential processing, the primary thread proceeds to process the service packet by invoking one service worker after the other. In the synchronous parallel processing, the primary thread spawns' parallel threads for each flow. This should be carefully crafted during configuration phase so as there is no dependency between each flow in terms of the inputs. In the asynchronous sequential processing, the service packet is published to a service pool. The service workers pick the service packet sequentially and process and put it back into the service pool. The service worker also plays a vital role of keeping track of the input/output bytes of each service invocation in a persistent stack. This feature of input-output persistent stack is used for enabling the mapping of inputs to one service from one/ more other service output/input and not necessarily an output-feedback model as illustrated in FIG. 4.

Further, for executing the asynchronous service requests, the service packets are persisted in the Relational Database Management System (RDBMS). If the service must be responded asynchronously the service packet is published to the service pool. The service pool is a design approach that creates an in-memory service packet and are individually processed by the service workers designated of each flow. The service response manager manages error handling, retries and confirmation of the transaction within or across the one or more blockchain platforms.

At the next step 214 of the method 200, the one or more hardware processors 108 are configured by the programmed instructions to invoke each of the one or more flows of the service packet instance to stamp with a flow hash, wherein the flow hash of each flow is linked with the unique hash of the service packet instance.

At the next step 216 of the method 200, the one or more hardware processors 108 are configured by the programmed instructions to generate a ledger hash using the pseudo-random generator. The ledger hash comprising a service hash, a business unique parameter hash and a block-hash. The block-hash is generated from at least one of the one or more blockchain platforms.

At the next step 218 of the method 200, the one or more hardware processors 108 are configured by the programmed instructions to form a hash-tree to link ledger hash, flow hash, and the unique hash of the service packet instance.

The hash-tree is created out of service orchestration and the various service invocation allows to create a complete map of service execution within or across one or more blockchain platforms to trace its effect on various asset ledgers and wallets. Further, the hash-tree establishes a pseudo-relation between the one or more services by mapping hashes enabling traceability within or across blockchain platforms, tracking execution status and retrieves ledger data based on the hashes embedded within a ledger.

The hash-tree maps a transaction record with its related transactions within or across one or more blockchain platforms. The hash-tree created out of service orchestration the various service invocation, allows to create a complete map of service execution within or across one or more blockchain platforms and trace its effect on various asset ledgers and wallets.

Figure 5:
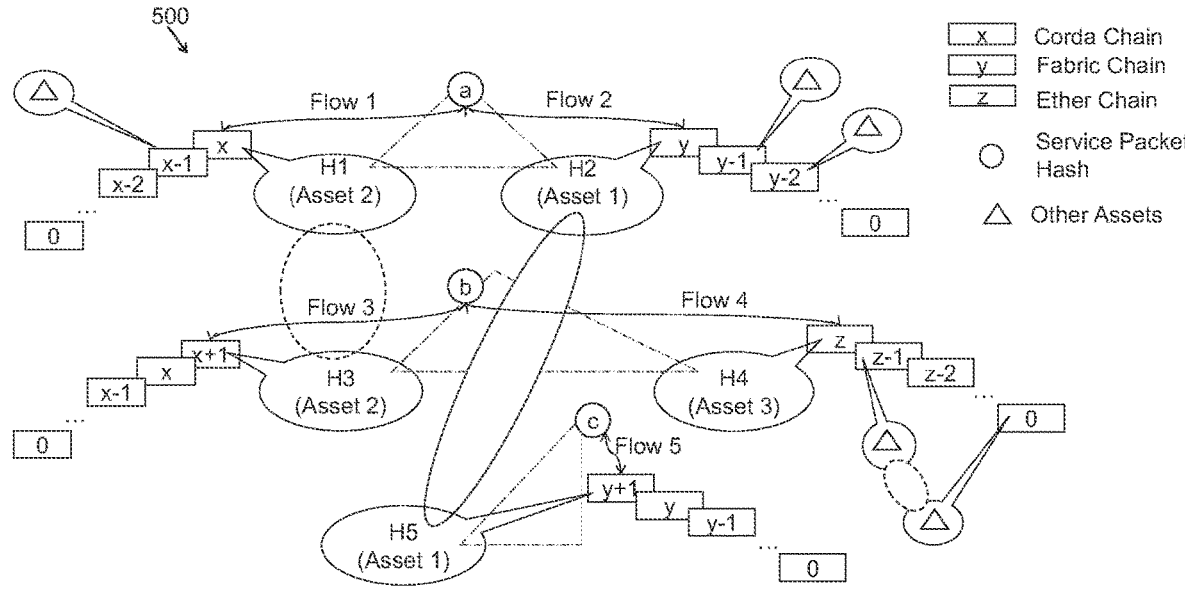
FIG. 5 is a schematic diagram depicting a hash-tree web, in accordance with some embodiments of the present disclosure.

FIG. 5 is a schematic diagram depicting a hash-tree web, in accordance with some embodiments of the present disclosure. The hash-tree web is created to trace all transactions impacting ledger data within/within or across one or more blockchain platforms. Herein, hashes 'H1' and 'H2' are two service hashes linked to a parent service packet Hash 'a'. The 'H1' is subjected to one WorldState on the Corda ledger and the 'H2' is subjected to another WorldState on a Hyperledger fabric ledger. Similarly, hashes 'H3' and 'H4' are two service hashes linked to the parent service packet Hash 'b' and 'H5' is one service hash linked to the parent service packet Hash 'c'. The 'H3' is subjected to same WorldState on the Corda Ledger as 'H1' and the 'H4' is subjected to another WorldState on Ethereum Ledger. The 'H5' is subjected to same WorldState on the Hyperledger fabric ledger as 'H2'. This establishes a dynamic pseudo-relation between Service packet hash 'a' 'b' and 'c' thereby mapping H1, H2, H3, H4 and H5 in a common web of Hashes enabling complete traceability within or across blockchain platforms tracking execution status and including the retrieval of ledger data based on the hashes embedded within the ledger.

The service hash is generated for each of the service request which is linked to the hash of the transaction request generated for the transaction initiated by the customer on user interface (UI) or an application programming interface (API) call invoked by an external application.

In one illustration, wherein invoking a payment transaction on Corda which can look up and validate the beneficiary know your customer (KYC) information published on a Hyperledger Fabric platform before executing the transaction. It has a unique transaction request hash which is linked to the individual service hashes generated for each of the dependent service invocation to multiple blockchain platforms.

In another illustration, wherein invoking transaction settlement on a public Ethereum and Bitcoin network. Whilst recording the reward points earned from these transactions on the Hyperledger Fabric based rewards ecosystem creating fungible rewards.

At the next step 220 of the method 200, the one or more hardware processors 108 are configured by the programmed instructions to execute the one or more flows within or across the one or more blockchain platforms based on the determined nature of processing to receive one or more responses based on the flow executions.

Finally at the last step 222 of the method 200, the one or more hardware processors 108 are configured by the programmed instructions to assess the received one or more responses to construct a final response, wherein the final response includes a commit, a roll back, or a reversal of the business transaction within or across the one or more blockchain platforms.

In the sequential processing of the synchronous service packet instance, a primary thread proceeds to process the service packet by invoking one service worker after the other. And, in a parallel processing of the synchronous service packet instance a primary thread spawns' parallel threads for each flow. The service worker also plays a vital role of keeping track of the Input/Output bytes of each service invocation in a persistent stack. This feature of input-output persistent stack is used for enabling the mapping of inputs to one service from one/more other service output/input and not necessarily an output-feedback model. In the event of a system crash the persistent stack is used to start the processing from where it had stopped as all the inputs are available.

For executing asynchronous service requests, the service packet instances are persisted in a Relational Database Management System (RDBMS). If the service is responded asynchronously the service packet is published to the service pool. The service pool is a design approach that creates an in-memory service packet instance and are individually processed by the service worker designated for each flow.

In one example, wherein a service ABC is configured to perform a service packet generation and persistence, reference data validation on a Hyperledger Fabric (HLF) consortium, create details in the HLF consortium. Based on valid record of the reference data validation on the HLF consortium and the generated unique ID in the HLF consortium, a new transaction is issued to party A in Corda. Based on created details in the HLF consortium, the new transaction ID is communicated to Party B in Corda.

In the sequential processing of the asynchronous service packet instance, the service packet instance is published to a pool. The service workers pick the service packet and processes the flows sequentially and put it back into the pool. And, in the parallel processing of the asynchronous service packet instance the service packet instance is published to a pool. The service workers pick the service packet and processes the flows in parallel to put it back into the pool.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address the problem of interoperability among various blockchain platforms. There is a need to introduce a layer which can seamlessly orchestrate services within or across various blockchain platforms. Embodiments herein provide a method and system for a framework to orchestrate and manage the transactions within or across multiple blockchain platforms without making any change to the underlying platform protocols. As there is an increase in the different blockchain platforms used for various use cases, there is also an increasing need to interoperate between these platforms to reduce data replication and assure single source of truth within or across multiple platforms. The framework allows to orchestrate operations within or across several blockchain platforms without impacting the blockchain protocol layer thereby reducing the time and effort needed in creating targeted interoperability solution for each blockchain platform.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs, GPUs etc.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method comprising:

receiving, via an input/output interface coupled to one or more hardware processors, a request for a business transaction as an input, to orchestrate one or more services of a business operation within one or more blockchain platforms;

identifying, via the one or more hardware processors, a configuration associated with each of the one or more services, wherein the configuration provides an operational need of the business that is executed one of (a) parallelly or, (b) sequentially from a service pool;

generating, via the one or more hardware processors, a service packet instance for each of the one or more services based on the identified configuration, wherein the service packet instance includes one or more flows within the one or more blockchain platforms;

stamping, via the one or more hardware processors, the generated service packet instance with a unique hash, wherein the unique hash comprises a Service-ID of the service packet, collection of one or more business unique fields for world state acted upon, data and time of service invocation, a unique ID of a user who has initiated the business transaction and a random byte generated during generation of the unique hash;

analyzing, via the one or more hardware processors, the stamped service packet instance to identify at least one of (a) an asynchronous service packet instance, or (b) a synchronous service packet instance;

determining, via the one or more hardware processors, a nature of processing of the identified asynchronous service packet instance, and the synchronous service packet instance, wherein the nature of processing includes a sequential processing and a parallel processing from the service pool, wherein in the sequential processing of the synchronous service packet instance, a primary thread proceeds to process the service packet by invoking one service worker after the other, and wherein in the parallel processing of the synchronous service packet instance, the primary thread spawns parallel threads of each flow, wherein in the sequential processing of the asynchronous service packet instance, the service packet instance is published to a pool and one or more service workers pick the service packet and processes the flow sequentially to put it back into the pool, and wherein in the parallel processing of the asynchronous service packet instance, the service packet instance is published to the pool and the one or more service workers pick the service packet and processes the flows in parallel to put it back in the pool;

invoking, via the one or more hardware processors, each of the one or more flows of the service packet instance to stamp with a flow hash, wherein the flow hash of each flow is linked with the unique hash of the generated service packet instance;

generating, via the one or more hardware processors, a ledger hash wherein the ledger hash comprising a service hash, a business unique parameter hash, and a block-hash, wherein the service hash is generated for each of service request which is linked to hash of the business transaction request generated for the business transaction, wherein the business unique parameter hash is generated for one or more business parameters used for the one or more services, and wherein the block-hash is generated by at least one of the one or more blockchain platforms;

forming, via the one or more hardware processors, a hash-tree to link the generated ledger hash, the flow hash, and the unique hash of the service packet instance, wherein the hash-tree is created to trace transactions impacting ledger data within or across the one or more blockchain platforms, and wherein the hash-tree establishes a pseudo-relation between the one or more services by mapping hashes enabling traceability within or across the one or more blockchain platforms, tracking execution status and retrieving the ledger data based on the hashes embedded within the ledger;

executing, via the one or more hardware processors, the one or more flows within or across the one or more blockchain platforms based on the determined nature of processing to receive one or more responses based on the flow executions; and assessing, via the one or more hardware processors, the received one or more responses to construct a final response, wherein the final response includes a commit, a roll back, or a reversal of the transaction within the one or more blockchain platforms, thereby orchestrating the business operation within or across blockchain platforms without impacting blockchain protocol layer.

2. The processor-implemented method of claim 1, wherein the stamped service packet instance is persisted in a database.

3. The processor-implemented method of claim 1, wherein the hash-tree maps a transaction record with its related transactions within the one or more blockchain platforms.

4. A system comprising:

an input/output interface to receive a request for a business transaction as an input to orchestrate one or more services of a business operation within one or more blockchain platforms using an orchestration engine;

a memory in communication with the one or more hardware processors, wherein the one or more hardware processors are configured to execute programmed instructions stored in the memory to;

identify a configuration associated with each of the one or more services, wherein the configuration provides an operational need of the business that is executed one of (a) parallelly or (b) sequentially from a service pool;

generate a service packet instance for each of the one or more services based on the identified configuration, wherein the service packet instance includes one or more flows within or across the one or more blockchain platforms;

stamp the generated service packet instance with a unique hash, wherein the unique hash comprises a Service-ID of the service packet, collection of one or more business unique fields for world state acted upon, data and time of service invocation, a unique ID of a user who has initiated the business transaction and a random byte generated during generation of the unique hash;

analyze the stamped service packet instance to identify at least one of (a) an asynchronous service packet instance, or (b) a synchronous service packet instance;

determine a nature of processing of the identified asynchronous service packet instance, and the synchronous service packet instance, wherein the nature of processing includes a sequential processing and a parallel processing from the service pool, wherein in the sequential processing of the synchronous service packet instance, a primary thread proceeds to process the service packet by invoking one service worker after the other, and wherein in the parallel processing of the synchronous service packet instance, the primary thread spawns parallel threads of each flow, wherein in the sequential processing of the asynchronous service packet instance, the service packet instance is published to a pool and one or more service workers pick the service packet and processes the flow sequentially to put it back into the pool, and wherein in the parallel processing of the asynchronous service packet instance, the service packet instance is published to the pool and the one or more service workers pick the service packet and processes the flows in parallel to put it back in the pool;

invoke each of the one or more flows of the service packet instance to stamp with a flow hash, wherein the flow hash of each flow is linked with the unique hash of the generated service packet instance;

generate a ledger hash, wherein the ledger hash comprising a service hash, a business unique parameter hash, and a block-hash, wherein the service hash is generated for each of service request which is linked to hash of the business transaction request generated for the business transaction, wherein the business unique parameter hash is generated for one or more business parameters used for the one or more services, and wherein the block-hash is generated by at least one of the one or more blockchain platforms;

form a hash-tree to link the generated ledger hash, the flow hash, and the unique hash of the service packet instance, wherein the hash-tree is created to trace transactions impacting ledger data within or across the one or more blockchain platforms, and wherein the hash-tree establishes a pseudo-relation between the one or more services by mapping hashes enabling traceability within or across the one or more blockchain platforms, tracking execution status and retrieving the ledger data based on the hashes embedded within the ledger;

execute the one or more flows within the one or more blockchain platforms based on the determined nature of processing to receive one or more responses based on the flow executions; and assess the received one or more responses to construct a final response, wherein the final response includes a commit, a roll back, or a reversal of the transaction within the one or more blockchain platforms, thereby orchestrating the business operation within or across blockchain platforms without impacting blockchain protocol layer.

5. The system of claim 4, wherein the stamped service packet instance is persisted in a database.

6. The system of claim 4, wherein the hash-tree maps a transaction record with its related transactions within one or more blockchain platforms.

7. One or more non-transitory machine-readable information storage mediums comprising one or more instructions which when executed by one or more hardware processors cause:

receiving, via an input/output interface, a request for a business transaction as an input to orchestrate one or more services of a business operation within one or more blockchain platforms;

identifying a configuration associated with each of the one or more services, wherein the configuration provides an operational need of the business that is executed one of (a) parallelly, or (b) sequentially from a service pool;

generating a service packet instance for each of the one or more services based on the identified configuration, wherein the service packet instance includes one or more flows within the one or more blockchain platforms;

stamping the generated service packet instance with a unique hash, wherein the unique hash comprises a Service-ID of the service packet, collection of one or more business unique fields for world state acted upon, data and time of service invocation, a unique ID of a user who has initiated the business transaction and a random byte generated during generation of the unique hash;

analyzing the stamped service packet instance to identify at least one of (a) an asynchronous service packet instance, or (b) a synchronous service packet instance;

determining a nature of processing of the identified asynchronous service packet instance, and the synchronous service packet instance, wherein the nature of processing includes a sequential processing and a parallel processing from the service pool, wherein in the sequential processing of the synchronous service packet instance, a primary thread proceeds to process the service packet by invoking one service worker after the other, and wherein in the parallel processing of the synchronous service packet instance, the primary thread spawns parallel threads of each flow, wherein in the sequential processing of the asynchronous service packet instance, the service packet instance is published to a pool and one or more service workers pick the service packet and processes the flow sequentially to put it back into the pool, and wherein in the parallel processing of the asynchronous service packet instance, the service packet instance is published to the pool and the one or more service workers pick the service packet and processes the flows in parallel to put it back in the pool;

invoking each of the one or more flows of the service packet instance to stamp with a flow hash, wherein the flow hash of each flow is linked with the unique hash of the generated service packet instance;

generating a ledger hash, wherein the ledger hash comprising a service hash, a business unique parameter hash, and a block-hash;

forming a hash-tree to link the generated ledger hash, the flow hash, and the unique hash of the service packet instance, wherein the hash-tree is created to trace transactions impacting ledger data within or across the one or more blockchain platforms, and wherein the hash-tree establishes a pseudo-relation between the one or more services by mapping hashes enabling traceability within or across the one or more blockchain platforms, tracking execution status and retrieving the ledger data based on the hashes embedded within the ledger;

executing the one or more flows within or across the one or more blockchain platforms based on the determined nature of processing to receive one or more responses based on the flow executions; and assessing the received one or more responses to construct a final response, wherein the final response includes a commit, a roll back, or a reversal of the transaction within the one or more blockchain platforms, thereby orchestrating the business operation within or across blockchain platforms without impacting blockchain protocol layer.

8. The one or more non-transitory machine-readable information storage mediums of claim 7, wherein the stamped service packet instance is persisted in a database.

9. The one or more non-transitory machine-readable information storage mediums of claim 7, wherein the hash-tree maps a transaction record with its related transactions within the one or more blockchain platforms.

10. The processor implemented method of claim 1, wherein the service execution is tracked using the hash-tree linked dynamically within or across multiple transaction requests and asset ledgers allowing complete visibility of interdependency of transactions.

* * * * *